3,661,798
PROCESS FOR REGENERATING NICKEL AND
COBALT HYDROGENATION CATALYSTS
Jean Cosyns, Nanterre, and Pierre Duhaut, Le Vesinet,
France, assignors to Institut Francais du Petrole, des
Carburants et Lubrifiants, Rueil Malmaison, Hauts-de-
Seine, France
No Drawing. Filed Apr. 14, 1970, Ser. No. 28,527
Claims priority, application France, Apr. 18, 1969,
6912376
Int. Cl. B01j 11/30, 11/02
U.S. Cl. 252—416
15 Claims

ABSTRACT OF THE DISCLOSURE

In the hydrogenation of aromatic and olefinic hydrocarbons containing about 1–200 parts per million by weight of sulfur, nickel and cobalt catalysts are deactivated and are difficult to regenerate. If, however, a silica carrier is employed, the regeneration of the catalysts can be accomplished by the successive steps of heating the deactivated catalysts with a gas containing molecular oxygen at 300–600° C., contacting resultant cooled catalysts with liquid water at about 0–250° C. and then with hydrogen at 200–500° C. This regeneration process does not work satisfactorily with alumina as a carrier.

---

This invention relates to a process for regenerating hydrocarbon hydrogenation catalysts, particularly nickel or cobalt on silica catalysts which have been used for hydrogenating aromatic, monoolefinic and diolefinic hydrocarbons.

It was prior known that the catalysts of nickel or cobalt on a support, when used for hydrogenating benzene to cyclohexane, were quickly poisoned by the sulfur-containing impurities of the feedstock. Thus it was practically necessary that the treated feedstocks contain less than 1 part per million by weight (1. p.p.m.) of sulfur.

When the feedstocks have higher sulfur contents, a desulfurization step must precede the hydrogenation step.

It is also well-known that, when used in the hydrogenation of olefinic hydrocarbons, the nickel and cobalt catalysts are quickly deactivated by the sulfur compounds of the feedstock and the conventional regeneration processes are inefficient.

However, in the selective hydrogenation of diolefinic hydrocarbons, for example the selective hydrogenation of pyrolysis gasolines, the sulfur compounds of the feedstock do not deactivate the catalyst so quickly, and the conventional reactivation and regeneration processes are convenient in most cases.

However, when the diolefinic hydrocarbons are to be hydrogenated more completely, for example up to the paraffinic state, the catalyst quickly loses its activity with respect to this type of hydrogenation, and the conventional regeneration processes are insufficient in that case.

Most often, when deactivated, a nickel or cobalt hydrogenation catalyst must be removed from the reaction vessel since no in situ regeneration process may be applied thereto. Thus, such conventional operations as, for example, passing over-heated hydrogen (at 300–400° C.), steam-treating, roasting in air and subsequently reducing the formed nickel or cobalt oxide, do not provide for positive results. Some of these operations, however, when applied to nickel and cobalt catalysts which have been deactivated previously in other reactions, are known to give positive results, which shows that the hydrogenation of aromatic and olefinic hydrocarbons constitutes a special case.

It has now surprisingly been observed that nickel and cobalt catalysts which had been deactivated in the hydrogenation of aromatic or olefinic hydrocarbons or in the complete hydrogenation of diolefinic hydrocarbons can be regenerated, provided these catalysts have a silica carrier, by a regeneration process which is described herein and constitutes an object of this invention.

The hydrogenations to which this invention applies are briefly the following:

The hydrogenation of aromatic hydrocarbons containing, for example, from 6 to 10 carbon atoms, e.g. benzene or naphthalene, alkyl-aromatic hydrocarbons containing, for example, 7 to 15 carbon atoms, for example toluene, xylenes or alkyl-naphthalenes.

These hydrocarbons may contain from 1 to 50 parts per million of parts by weight of sulfur, for example as thiophene compounds, sulfides, disulfides and mercaptans.

The hydrogenation of mono-olefinic hydrocarbons containing for example, from 5 to 20 carbon atoms. These hydrocarbons may be used as such or as mixtures in hydrocarbon cuts. They may contain from 1 to 50 parts per million of parts by weight of sulfur for example as thiophene compounds, sulfides, disulfides and mercaptans.

The hydrogenation of diolefinic hydrocarbons containing, for example, from 5 to 12 carbon atoms. These diolefinic hydrocarbons may be used as such or as mixtures with other compounds in hydrocarbon cuts, for example pyrolysis gasolines such as steam-cracking gasolines which, in addition to diolefines, may contain mono-olefines and aromatic hydrocarbons. In that case, only the diolefines and the olefines may be hydrogenated and not the aromatic hydrocarbons. The feedstock may contain from 1 to 200 parts per million of parts by weight of sulfur, for example as thiophene compounds, sulfides, disulfides and mercaptans.

The hydrogenation may be carried out in liquid or vapor phase, according to the chosen embodiment. The temperatures may be selected between 20 and 300° C., particularly between 50 and 230° C., and the pressures may range from 1 to 100 atmospheres, particularly from 10 to 50 atmospheres. The hydrogenation of diolefines is carried out preferably with the major part of the feed in liquid phase.

The catalyst which is to be used and to which this regeneration process is applicable specifically comprises reduced nickel and/or cobalt and silica. It may be manufactured in any convenient manner, for example by depositing nickel or cobalt oxides hydroxides or precursors salts on silica, or by admixing these compounds with the silica support, for example by crushing or co-precipitating. The obtained product is dried, roasted and the nickel and/or cobalt compounds are reduced to the metal active phase. The catalyst is preferably used in a fixed bed in the hydrogenation reactor.

The use of silica in this invention is critical since the catalysts of nickel or cobalt on alumina are not improved by the process of this invention. The results are obtained when the carrier contains more than 90% and preferably more than 98% by weiht of silica.

During these hydrogenations, the catalyst is deactivated, as shown before, by the sulfur poisons of the feed. When the desired hydrogenation yield is no longer attained, the deactivated catalyst is subjected to the regeneration process of this invention.

This regeneration process consists, in a first step, of heating the poisoned catalyst in a molecular oxygen-containing gas at a temperature between 300 and 600° C., the preferred heating time being from 1 to 6 hours. The gas has a preferred oxygen content of 3 to 50% by volume and many contain an inert gas, for example nitrogen, carbon dioxide or steam. The preferred pressure is 1 to 10 atmospheres and the preferred gas feed rate is 50 to 500 liters per liter of catalyst and per hour. The preferred gas is air.

In a second step, the catalyst is treated with liquid water at about 0 to 250° C., for a preferred time of 1 to 12 hours. Water is used at a preferred hourly feed rate of 0.1 to 100 liters per liter of catalyst, the pressure being sufficient to maintain water in the liquid state; this pressure may be obtained by means of such a gas as oxygen, steam, hydrogen, nitrogen, carbon dioxide and gaseous saturated hydrocarbons.

In a third step, the catalyst is treated with hydrogen at about 200 to 500° C., for a preferred time of 1 to 24 hours. The preferred pressure is 1 to 10 atmospheres and the hourly feed rate of hydrogen is 50 to 500 liters per liter of catalyst.

The regeneration process of this invention may be carried out on the catalyst withdrawn from the reaction vessel, or preferably in situ in the hydrogenation vessel.

After the regeneration treatment, the hydrogenation may be resumed and it may be observed that the catalyst has recovered its initial activity.

The following non-limitative examples illustrate the invention, Examples 1A, 1B, 3A, 4A, 4B, 5A, 5B, 6A and 6B being given by way of comparison.

EXAMPLE 1

A catalyst containing 20% by weight of nickel has been manufactured from nickel formate and pure silica; its specific surface was 200 m.$^2$ per gram and its pore volume was 0.7 ccm. per gram. A mixture of 20% molar of benzene with 80% molar of cyclohexane and hydrogen has been passed through the catalyst under the following conditions:

Hydrogen pressure: 40 atmospheres
P.p.h. (hourly weight of feed/weight of catalyst): 8
H$_2$/feed ratio: 1 mole per mole
Temperature: 100° C.

The feedstock contained initially less than 1 p.p.m. of sulfur. The initial activity of the catalyst at 100° C. corresponded to a conversion rate of benzene of 60%.

300 p.p.m. of sulfur from thiophene have been added to the feedstock to quickly poison the catalyst.

The conversion of benzene quickly decreases to 0.1% after about 8 to 10 hours.

The poisoned catalyst has been regenerated by the following treatment:

Heating at 500° C. for 2 hours in an air stream of 250 liters (NTP) per liter of catalyst and per hour, the pressure being 2 atmospheres,
Cooling in air down to 80° C.,
Washing with water at 80° C. at a hourly feed rate of 2 liters per liter of catalyst for 8 hours at atmospheric pressure,
Drying at 200° C. in air,
Treating with hydrogen at 400° C. and 5 atmospheres for 12 hours, the hourly feed rate being 200 liters (NTP) per liter of catalyst.

After this treatment, the feedstock may be hydrogenated at 100° C. with a conversion of 59%.

EXAMPLES 1A AND 1B

Two catalysts identical to that of Example 1 have been poisoned as described in Example 1.

The poisoned catalysts have been subjected:
One to a regeneration treatment consisting of passing hydrogen at 400° C. and 5 atmospheres for 15 hours at the feed rate of Example 1,
The other to a regeneration treatment consisting of heating in air at 500° C. followed with reducing in hydrogen at 400° C. the air and hydrogen feed rates being as in Example 1.

In no case the conversion of benzene was higher than 0.1%.

EXAMPLE 2

The catalyst of Example 1 has been used to hydrogenate a feedstock similar to that of Example 1, except that its sulfur content was 5 p.p.m. The operating conditions were as follows:

Hydrogen pressure: 40 atmospheres
P.p.h.: 5
Ratio H$_2$/feedstock: 0.8 mole/mole
Temperature: 200° C.

The hydrogenation is continued as long as the produced cyclohexane is at least 98% pure, i.e. for 2050 hours. Then the catalyst has been treated as follows:

Heating at 400° C. and 4 atmospheres for 3 hours in an air stream of 200 liters per liter of catalyst and per hour,
Cooling in air down to 120° C.
Washing with water at 120° C. and 2 atmospheres for 6 hours, the water hourly feed rate being 3 liters per liter of catalyst,
Drying at 200° C.,
Treating with hydrogen at 350° C. and 6 atmospheres for 10 hours, at a hourly feed rate of 200 liters per liter of catalyst.

After this treatment, the catalyst was able to produce cyclohexane at 98% minimum purity for more than 1700 hours.

EXAMPLE 3

A catalyst such as described in Example 1 has been used for hydrogenating the following white spirit:

Distillation A.S.T.M.:
    Initial B.P. at 150° C.
    50% at 162° C.
    Final B.B. at 195° C.
Specific weight at 15° C.: 0.785
Composition:
    Aromatic hydrocarbons: 17% by weight
    Cycloparaffins: 25% by weight
    Paraffins: 58%
    Sulfur content: 6 p.p.m. by weight The operating conditions were as follows:

Hydrogen pressure: 40 bars
H$_2$/feed: 1 mole per mole
P.p.h.: 2
Temperature: 220° C.

The maximum tolerated content of aromatic hydrocarbons was 1% at the outlet of the hydrogenation vessel. The fresh catalyst could be used for 1900 hours. Then the deactivated catalyst was treated as follows:

(a) heating in air at 450° C. and 2 atmospheres for 4 hours. The air hourly feed rate was 180 liters per liter of catalyst
(b) cooling down to 90° C.
(c) washing with water at 90° C. and 1.2 bars for 8 hours (5 liters of water per liter of catalyst per hour)
(d) drying at about 200° C.
(e) treating with hydrogen at 300° C. and 4 atmospheres for 14 hours (250 liters of hydrogen per liter of catalyst and per hour)

By use of the thus-treated catalyst, a white spirit containing less than 1% of aromatic hydrocarbons has been obtained for 1,600 hours.

EXAMPLE 3A

The catalyst used in this example consisted of 20% nickel on a transition alumina having a specific surface of 210 m.$^2$ per gram and a pore volume of 0.67 ccm. per gram.

The feedstock and the hydrogenation conditions were the same as in Example 3.

The maximum content of aromatic hydrocarbons at the outlet of the reaction vessel was 1%.

This figure was obtained for 1,500 hours with the fresh catalyst; then the regeneration treatment of Example 3 was applied thereto.

It was no longer possible to obtain a product containing less than 1% of aromatic hydrocarbons, even at temperatures up to 250° C., the latter being a maximum for reasons of apparatus and reaction selectivity (an excessive cracking takes place beyond 250° C.).

The deactivated catalyst was not improved by a longer regeneration treatment, even if carried out at higher temperatures.

EXAMPLE 4

The catalyst is the same as described in Examples 1 to 3.

The feedstock is a cut consisting essentially of olefines having 9 to 13 carbon atoms and 20 parts per million by weight of sulfur. Its molecular weight is about 148. Its bromine number which is proportional to the content of olefines, is 108 g. of bromine for 100 g. of feed.

The desired product must contain practically all the olefines in the hydrogenated state, corresponding to a low bromine number.

The hydrogenation conditions were as follows:

Pressure: 30 atmospheres
$H_2$/feed: 1.5 mole per mole
P.p.h.: 2
Temperature: 180° C.

After 100 hours of run, the bromine number was still lower than 1.

It was 1.6 after 1,000 hours and 5.9 after 2,500 hours.

The regeneration process of Example 1 was applied to the deactivated catalyst, thus resutling in a regenerated catalyst; the bromine number of the hydrogenated product was lower than 1.

EXAMPLE 4A

A catalyst such as described in Example 4 has been deactivated under the same hydrogenation conditions.

It was subjected to a treatment consisting of passing hydrogen at 400° C. and 5 bars for 15 hours at a hourly rate of 200 liters per liter of catalyst.

It was not possible to obtain a sufficiently low bromine number with the thus-treated catalyst.

EXAMPLE 4B

A catalyst of nickel on silica which had been deactivated as in Example 4 has been heated up to 500° C. in an air stream, and then reduced in hydrogen at 400° C., the operating conditions with respect to air and hydrogen being those given in Example 1.

It was not possible to obtain with the thus treated catalyst a hydrogenation product having a sufficiently low bromine number.

The results of Examples 4A and 4B show that the regeneration treatments of these examples are not able to restore the activity of the catalyst; on the contrary, the catalyst recovers its initial activity with the treatment of Example 4.

EXAMPLE 5

The catalyst consisted of 20% by weight of cobalt on a silica carrier; it was manufactured from cobalt initrate and silica.

The feedstock and the operating conditions were those of Example 4.

After 2,500 hours, the deactivated catalyst was subjected to the regeneration treatment of Example 1.

The results, with respect to the bromine number of the hydrogenated product, were following:

After 100 hours: <1
After 1,000 hours: 2.0
After 2,500 hours: 7.7
After regeneration: ≤1

EXAMPLES 5A AND 5B

Example 5 has been repeated, except that the regeneration treatments were the following:

One catalyst was treated with hydrogen at 400° C. and 6 atmospheres for 16 hours, the hourly feed rate being 200 liters per liter of catalyst, Another catalyst was heated at 500° C. in an air stream and then reduced with hydrogen at a hourly feed rate of 250 liters per liter of catalyst, the pressure being 5 atmospheres.

The bromine number of the hydrogenated product was the following:

| | After 100 hours | After 1,000 hours | After 2,500 hours | After regeneration |
|---|---|---|---|---|
| Example: | | | | |
| 5A | <1 | 2.0 | 7.5 | 7.4 |
| 5B | <1 | 2.1 | 8.0 | 7.0 |

EXAMPLE 6

The catalyst consisted of 15% nickel by weight on silica; it was manufactured from nickel nitrate. It was used for hydrogenating a stream-cracking gasoline having the following characteristics:

Composition (percent by volume):
  Paraffinic and naphthenic hydrocarbons: 11
  Olefines+diolefines: 37
  Aromatic hydrocarbons: 52
Specific weight at 15° C.: 0.849
Bromine number (I Br) 71 grams for 100 grams
Maleic anhydride value (MAV): 70 g. per gram
Distillation ASTM:
  Beginning at 49° C.
  50% at 111° C.
  End at 201° C.
Content of sulfur: 150 p.p.m. by weight.

The desired product must have a content of diolefines of practically zero (MAV) and a content of olefines at least 50% lower (I Br) than the initial content.

The operating conditions were as follows:

Pressure: 30 atmospheres
$H_2$/feed: 1 mole per mole
P.p.h.: 2
Temperature: 150° C.

After 3,000 hours, the deactivated catalyst was treated as follows:

Heating at 400° C. and 3 atmospheres for 3 hours in an air stream of 200 liters per liter of catalyst and per hour,
Cooling down to 100° C.,
Washing with water at 100° C. and 1.5 atmospheres for 6 hours at a hourly feed rate of 2 liters per liter of catalyst,
Drying at 250° C.,
Treatment with hydrogen at 300° C. and 4 atmospheres for 12 hours at a hourly feed rate of 200 liters per liter of catalyst.

The characteristics of the product obtained with the new catalyst, the deactivated catalyst and the regenerated catalyst are the following:

| New catalyst | | Deactivated catalyst | | Regenerated catalyst | |
|---|---|---|---|---|---|
| MAV | Conversion of olefines, percent | MAV | Conversion of olefines, percent | MAV | Conversion of olefines, percent |
| <1 | 57.0 | 1.5 | 44.5 | <1 | 56.7 |

The olefines conversion rate is given by the percentage variation of the bromine number in the hydrogenation product with respect to the feed bromine number.

$$\text{Percent conversion} = 100 \frac{\Delta \text{IBr}}{\text{initial IBr}}$$

EXAMPLES 6A AND 6B

Example 6 has been repeated with two catalysts.
The regeneration techniques were the following:

Passing hydrogen on the first catalyst at 400° C. and 5 atmospheres for 15 hours at an hourly feed rate of 250 liters per liter of catalyst, Heating the second catalyst at 500° C. and 4 atmospheres in an air stream at a rate of 200 liters per liter of catalyst and per hour, followed with a reducing treatment under the conditions of Example 6A.

The results are the following:

| | New catalyst | | Deactivated catalyst after 3,000 hours | | Treated catalyst | |
|---|---|---|---|---|---|---|
| | MAV | Olefines conversion, percent | MAV | Olefines conversion, percent | MAV | Olefines conversion, percent |
| Example: | | | | | | |
| 6A | <1 | 56.4 | 1.5 | 45.5 | <1 | 45 |
| 6B | <1 | 55.8 | 1 | 44.2 | <1 | 44.5 |

What we claim as our invention:

1. A process for regenerating catalysts consisting essentially of a carrier and at least one reduced metal selected from the group consisting of nickel and cobalt, said carrier being essentially silica, said catalysts having been deactivated by their use in the hydrogenation of sulfur-containing hydrocarbons selected from the group consisting of aromatic, monoolefinic and diolefinic hydrocarbons, said process consisting essentially of the successive steps of heating the deactivated catalyst with a molecular oxygen-containing gas at 300 to 600° C., cooling said heated catalyst, treating the said catalyst with liquid water at about 0–250° C., drying resultant washed catalyst, and then treating resultant dried catalyst with hydrogen at 200–500° C.

2. The process of claim 1, wherein the heating with a molecular oxygen-containing gas is carried out at 1–10 atmospheres.

3. The process of claim 1, wherein the hourly feed rate of the molecular oxygen containing gas is 50–500 liters per liter of catalyst.

4. The process of claim 1, wherein the oxygen content of the gas is 3–50% by volume.

5. The process of claim 1, wherein the liquid water hourly feed rate is 0.1–100 liters per liter of catalyst.

6. The process of claim 1, wherein the pressure is high enough to maintain water in the liquid state.

7. The process of claim 1, wherein the hydrogen contacting step is carried out at 1–10 atmospheres.

8. The process of claim 1, wherein the hydrogen hourly feed rate is 50–500 liters per liter of catalyst.

9. The process of claim 1, wherein the catalyst has been deactivated in the hydrogenation of aromatic hydrocarbons.

10. The process of claim 1, wherein the catalyst has been deactivated in the hydrogenation of monoolefinic hydrocarbons.

11. The process of claim 1, wherein the catalyst has been deactivated in the hydrogenation of diolefinic hydrocarbons.

12. The process of claim 1, said hydrocarbon containing 1–200 parts per million by weight of sulfur.

13. The process of claim 1, said silica carrier containing more than 90% by weight silica.

14. The process of claim 1, said silica carrier containing more than 98% by weight silica.

15. The process of claim 1, said regenerating being conducted in situ in a hydrogenation vessel.

References Cited

UNITED STATES PATENTS

| | | | |
|---|---|---|---|
| Re. 22,097 | 5/1942 | Wells | 252—411 S |
| 2,225,811 | 12/1940 | Wells | 252—416 |
| 3,562,150 | 2/1971 | Hamilton et al. | 252—416 |
| 2,772,947 | 12/1956 | Sowerwine, Jr. | 252—415 |
| 3,147,209 | 9/1964 | Erickson et al. | 252—420 |
| 2,273,864 | 2/1942 | Houdry | 252—411 S |
| 3,172,863 | 3/1965 | Brooke | 252—411 R |

DANIEL E. WYMAN, Primary Examiner

P. E. KONOPKA, Assistant Examiner

U.S. Cl. X.R.

208—143; 252—420; 260—667, 683.9